(12) United States Patent
Lin

(10) Patent No.: US 8,542,284 B2
(45) Date of Patent: Sep. 24, 2013

(54) GAIN-ADJUSTING APPARATUS FOR OPTICAL IMAGE STABILIZER AND METHOD THEREOF

(75) Inventor: Yi-Chang Lin, Tantz Shiang (TW)

(73) Assignee: Asia Optical International Ltd., Tortola (VG)

( * ) Notice: Subject to any disclaimer, the term of this patent is extended or adjusted under 35 U.S.C. 154(b) by 480 days.

(21) Appl. No.: 12/563,480

(22) Filed: Sep. 21, 2009

(65) Prior Publication Data
US 2010/0134638 A1 Jun. 3, 2010

(30) Foreign Application Priority Data
Dec. 3, 2008 (TW) ................................ 97147004 A

(51) Int. Cl.
*H04N 5/228* (2006.01)
(52) U.S. Cl.
USPC ................. 348/208.6; 348/208.99; 348/208.4

(58) Field of Classification Search
USPC .................... 348/208.3, 208.99, 208.4, 208.6
See application file for complete search history.

(56) References Cited

U.S. PATENT DOCUMENTS

| | | | |
|---|---|---|---|
| 7,932,925 B2 * | 4/2011 | Inbar et al. ................. | 348/208.2 |
| 2007/0146488 A1 * | 6/2007 | Higurashi et al. ......... | 348/208.3 |
| 2009/0086033 A1 * | 4/2009 | Watanabe et al. .......... | 348/208.2 |

* cited by examiner

*Primary Examiner* — Anthony J Daniels
(74) *Attorney, Agent, or Firm* — Morris Manning & Martin LLP; Tim Tingkang Xia, Esq.

(57) ABSTRACT

A gain-adjusting apparatus and method thereof are described. The gain-adjusting apparatus includes an integrator, a first register, a control unit, and a second register. The integrator integrates the gyro signal data to generate the integral data. The control unit is coupled to the first register and the second register, respectively. The control unit determines whether the gyro signal data is either greater than an upper gyro threshold or less than a lower gyro threshold to detect the gyro signal data and decrease the gain value stored in the second register.

16 Claims, 6 Drawing Sheets

GAIN-ADJUSTING APPARATUS FOR OPTICAL IMAGE STABILIZER AND METHOD THEREOF

FIELD OF THE INVENTION

The present invention relates to an adjusting apparatus and method thereof, and more particularly to a gain-adjusting apparatus and method thereof applicable to an optical image stabilizer.

BACKGROUND OF THE INVENTION

With the rapid development of information technology, the manufacture of consuming electronic products is becoming more and more diverse. For example, computer, liquid crystal display (LCD) TV, video camera, and digital camera are widely used. Particularly, the slim digital camera is portable for the user and the requirement of the display quality of capture photos and pixel standard are thus more and more increased. However, it is necessary to enhance the quality of the photos by increasing stability of the digital camera when the quality of captured photos may be degraded due to the vibration of the digital camera. Conventionally, when the camera is moved to a predetermined position and its internal optical image stabilizer (OIS) is turned on, the gyro within the camera is capable of detecting the sway status of the camera along all around and a gyro signal is generated. The OIS is compensated according to the gyro signal to stabilize the camera. However, when the camera is at a moving action, not a stable status, the value of gyro signal is increased on the basis of single direction. Meanwhile, since the optical image stabilizer (OIS) is activated by the camera, the camera compensates the optical image stabilizer (OIS), thereby resulting in an abnormal sway status in the preview display area of the camera and downgraded photo quality after the moving action stops at the predetermined position. Such a situation is termed a panning effect. Consequently, there is a need to develop a novel optical image stabilizer (OIS) for solving the aforementioned problems.

SUMMARY OF THE INVENTION

The objective of the present invention is to provide a gain-adjusting apparatus and method thereof applicable to the optical image stabilizer (OIS) of image processing equipment in order to avoid the abnormal sway status, i.e. panning effect, in the display area of the camera.

According to the above objective, the present invention sets forth a gain-adjusting apparatus and method thereof. The gain-adjusting apparatus includes an integrator, a first register, a control unit and a second register. The first register of the gain-adjusting apparatus stores a predetermined gain value (GS) between an upper gain threshold (OH) and a lower gain threshold (GL).

The integrator receives a gyro signal data and integrates the gyro signal ($S_{gyro}$) data to generate an integral data, wherein the integrator is set to an integral threshold (IL) for operation. In one embodiment, the integrator integrates the gyro signal ($S_{gyro}$) data, e.g. angular velocity, with time so that the unit of the integral data is the same as the output unit of position sensor to allow the vibration compensation module to perform compensation procedure. The first register is used to store the gyro signal ($S_{gyro}$) data and the integral data. The control unit reads the gyro signal ($S_{gyro}$) data and determines whether the gyro signal data is either greater than an upper gyro threshold (TH) or less than a lower gyro threshold (TL).

The control unit detects the gyro signal ($S_{gyro}$) data when the gyro signal ($S_{gyro}$) data is either greater than an upper gyro threshold (TH) or less than a lower gyro threshold (TL). The second register stores a gain value. During the detection, the control unit determines whether a current gyro signal ($S_{gyro}$) data is greater than a previous gyro signal ($S_{gyro}$) data while the gyro signal ($S_{gyro}$) data is greater than the upper gyro threshold (TH), or whether the current gyro signal ($S_{gyro}$) data is less than the previous gyro signal ($S_{gyro}$) data while the gyro signal ($S_{gyro}$) data is less than the lower gyro threshold (TL), the control unit controls the second register to decrease the gain value so that the gain value is less than the predetermined gain value (GS). That is, such a determination is employed to decide whether the gain-adjusting apparatus is in a moving action.

During the moving action of the gain-adjusting apparatus compares the next gyro signal ($S_{gyro}$) data with the upper gyro threshold (TH) or the lower gyro threshold (TL) to determine whether the control unit increases the gain value in the second register so that the gain value returns to the predetermined gain value (GS).

According to the above descriptions, the image processing system moves with the captured objects and the gyro signal ($S_{gyro}$) data is increased on the basis of single direction during the moving action. When the gyro signal ($S_{gyro}$) data exceeds the upper gyro threshold (TH) or is less than the lower gyro threshold (TL), the image processing system is operated in the moving action and the gain-adjusting apparatus adjusts the gain value correspondingly.

Specifically, the gain-adjusting apparatus in the present invention determines whether the image processing system is operated in the moving action based on the adjustment of the gyro signal ($S_{gyro}$) data. When the image processing system is operated in the moving action, the gain-adjusting apparatus enters moving action mode. Meanwhile, the control unit adjusts the gain value in the second register to modify the gyro signal ($S_{gyro}$) data and the vibration compensation module. The vibration compensation module decreases the vibration compensation according to the adjusted gyro signal ($S_{gyro}$) data so that the erroneous compensation of the vibration compensation module due to the moving action is avoided advantageously. In other words, the adjusted gyro signal ($S_{gyro}$) data which is inputted to the vibration compensation module allow the vibration compensation module to make no vibration decision and reduce the compensation range. Therefore, the panning effect of the image on the display area due to the activation of the optical image stabilizer (OIS) is solved.

The controlling method includes the following steps of:

(1) Receiving gyro signal data.

(2) Integrating the gyro signal data to generate integral data.

(3) Storing the gyro signal data, the integral data and a gain value of the second register.

(4) The control unit detects whether the gyro signal data is either greater than an upper gyro threshold (TH) or less than a lower gyro threshold (TL). When the gyro signal data is either greater than an upper gyro threshold (TH) or less than a lower gyro threshold (TL), the control unit starts to detect the gyro signal ($S_{gyro}$) data. When the gyro signal data is either less than an upper gyro threshold (TH) or greater than a lower gyro threshold (TL), the gain-adjusting apparatus is operated in the vibration mode. The control unit 114 sets the gain value (GX) in the second register to be the predetermined gain value (GS).

(5) The control unit controls the first register to store the predetermined gain value (GS).

(6) During the detection of the gyro signal ($S_{gyro}$) data, the control unit compares the current gyro signal data (G2) with the previous gyro signal data (G1). When the current gyro signal data (G2) is greater than the previous gyro signal data (G1), the gain-adjusting apparatus is operated in the moving action. The control unit decreases the gain value (GX) in the second register such that the gain value (GX) is less than the predetermined gain value (GS). In one embodiment, when the gain-adjusting apparatus 100 is operated in the moving action, the control unit decreases the gain value (GX) by step-by-step mode. When the current gyro signal data (G2) is less than the previous gyro signal data (G1), the gain-adjusting apparatus is operated in the vibration mode and the control unit sets the gain value (GX) to be the predetermined gain value (GS).

(7) When the gain-adjusting apparatus is operated in moving action, the control unit compares the next gyro signal data (g1 or g2) with the upper gyro threshold (TH). If the next gyro signal data (g1 or g2) is less than the upper gyro threshold (TH), the mode of the gain-adjusting apparatus is changed from the moving action to the vibration mode and the control unit controls the second register to increase the gain value, as shown in step, so that the gain value (GX) returns to the predetermined gain value (GS). The next gyro signal data (g1 or g2) is positioned between the upper gyro threshold (TH) and the lower gyro threshold (TL).

(8) While the next gyro signal data (g1 or g2) is greater than the upper gyro threshold (TH), or the next gyro signal data (g1 or g2) is less than the lower gyro threshold (TL), the gain-adjusting apparatus 100 is still operated in the moving action. The control unit determines whether the adjusted gain value (GX) is less than the lower gain threshold (GL). If the adjusted gain value (GX) is less than the lower gain threshold (GL), the adjusted gain value (GX) is set to be the lower gain threshold (G1). If the adjusted gain value (GX) is greater than the lower gain threshold (GL), the control unit 114 continuously decreases the gain value (GX).

(9) When the next gyro signal data (g1 or g2) is less than the upper gyro threshold (TH) or greater than the lower gyro threshold (TL), the control unit decreases the integral value (IX) to the predetermined integral value (IL).

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
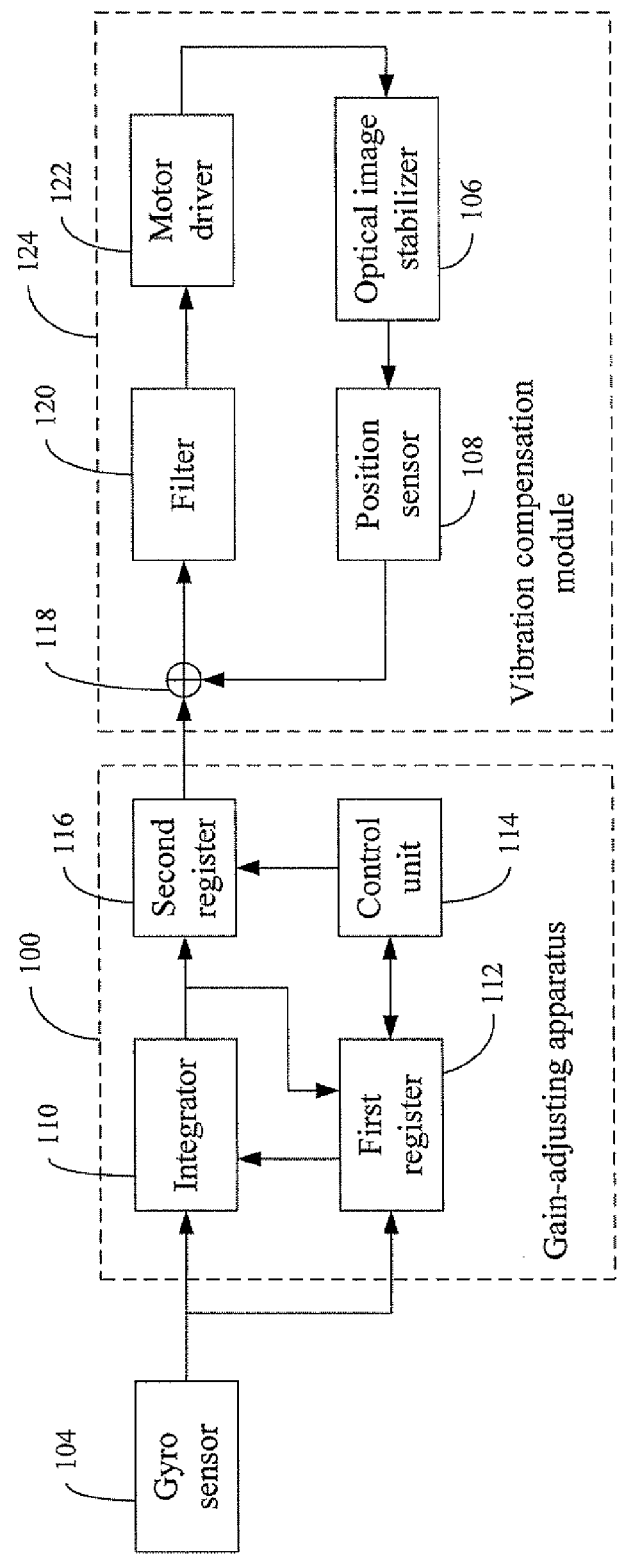
FIG. 1 is a schematic block diagram of an optical image stabilizer having a gain-adjusting apparatus according to one embodiment of the present invention.

FIG. 1 is a schematic block diagram of an optical image stabilizer (OIS) 102 having a gain-adjusting apparatus 100 according to one embodiment of the present invention. The gain-adjusting apparatus 100 couples the gyro sensor 104 to the vibration compensation module 124. The gain-adjusting apparatus 100 outputs the gyro signal data having adjusted gain to the vibration compensation module 124. The gain-adjusting apparatus 100 is applicable to the optical image stabilizer (OIS) in the image processing equipment, such as digital camera, video camera and/or image processing system with the image stabilizer (OIS). The gain-adjusting apparatus 100 includes an integrator 110, a first register 112, a control unit 114 and a second register 116. In one embodiment, the gain-adjusting apparatus 100 is selected from a micro control unit (MCU), a digital signal processing, a central processing unit (CPU), a complex programmable logic device (CPLD), a field programmable gate array (FPGA), and/or a system on-chip (SOC). The vibration compensation module 124 includes an optical image stabilizing platform 106, a position sensor 108, a summation device 118, a filter 120, and a motor driver 122.

In the gain-adjusting apparatus 100, the integrator 110 couples the gyro sensor 104 to the second register 116. The first register 112 is coupled to the gyro sensor 104, the integrator 110 and the second register 116, respectively. The control unit 114 is coupled to the first register 112 and the second register 116. The first register stores a predetermined gain value (GS) between an upper gain threshold (GH) and a lower gain threshold (GL). The predetermined gain value (GS) is independent from the vibration compensation module 124. That is, the predetermined gain value (GS) is irrelevant to the gain of the vibration compensation module 124. In one embodiment, the predetermined gain value (GS), the upper gain threshold (GH) and the lower gain threshold (GL) are stored in the first register 112 and/or the second register 116.

The integrator 110 receives a gyro signal data and integrates the gyro signal ($S_{gyro}$) data to generate an integral data, wherein the integrator 110 is set to an integral threshold (IL) for operation. In one embodiment, the integrator 110 integrates the gyro signal ($S_{gyro}$) data, e.g. angular velocity, with time so that the unit of the integral data is the same as the unit of the calculated data from the output of the position sensor 108 to allow the vibration compensation module 124 to perform compensation procedure. The first register 112 is used to store the gyro signal ($S_{gyro}$) data and the integral data. The control unit 114 reads the gyro signal ($S_{gyro}$) data and determines whether the gyro signal data is either greater than an upper gyro threshold (TH) or less than a lower gyro threshold (TL). The control unit 114 will start detecting the gyro signal ($S_{gyro}$) data when the gyro signal ($S_{gyro}$) data is either greater than an upper gyro threshold (TH) or less than a lower gyro threshold (TL). The second register 116 stores a gain value. During the detection, the control unit 114 determines whether a current gyro signal ($S_{gyro}$) data is greater than a previous gyro signal ($S_{gyro}$) data while the gyro signal ($S_{gyro}$) data is greater than the upper gyro threshold (TH), or whether the current gyro signal ($S_{gyro}$) data is less than the previous gyro signal ($S_{gyro}$) data while the gyro signal ($S_{gyro}$) data is less than the lower gyro threshold (TL), the control unit 114 controls the second register 116 to decrease the gain value so that the gain value is less than the predetermined gain value (GS). That is, such a determination is employed to decide whether the gain-adjusting apparatus 100 is in a moving action. In one embodiment, when the gain-adjusting apparatus 100 is operated in the moving action, the control unit 114 decreases the gain value in the second register 116 by a step-by-step mode.

During the moving action of the gain-adjusting apparatus 100 compares the next gyro signal ($S_{gyro}$) data with the upper gyro threshold (TH) and/or the lower gyro threshold (TL) to determine whether the control unit 114 increases the gain value in the second register 116 so that the gain value returns to the predetermined gain value (GS). The adjustment of the gain value of the gain-adjusting apparatus 100 will be described in FIG. 2A-2C. It should be noted that the first register 112 and the second register 114 may be two different sections or fields in a storage device or memory unit for rapidly read the gyro signal ($S_{gyro}$) data, integral data, and the gain value. In another case, the first register 112 and the second register 114 may be two different sections or fields in two storage devices or memory units, respectively. The memory unit may be memory card, e.g. secure digital card, memory stick card, compact flash card or multi-media card, or static dynamic random access memory (SDRAM).

According to the above descriptions, the image processing system moves with the captured objects and the gyro signal ($S_{gyro}$) data is increased on the basis of single direction during the moving action. When the gyro signal ($S_{gyro}$) data exceeds the upper gyro threshold (TH) or is less than the lower gyro threshold (TL), the image processing system is operated in the moving action and the gain-adjusting apparatus 100 adjusts the gain value correspondingly. In the present invention, when the magnitude of the gyro signal ($S_{gyro}$) data is between the upper gyro threshold (TH) or is less than the lower gyro threshold (TL), the control unit 114 sets the gain value in the second register 116 as the predetermined gain value.

Specifically, the gain-adjusting apparatus 100 in the embodiment of the present invention determines whether the image processing system is operated in the moving action based on the gyro signal ($S_{gyro}$) data which is greater than the upper gyro threshold (TH) or less than the lower gyro threshold (TL). When the image processing system is operated in the moving action, the gain-adjusting apparatus 100 enters moving action mode. Meanwhile, the control unit 114 adjusts the gain value in the second register 116 to modify the gyro signal ($S_{gyro}$) data and the vibration compensation module 124. The vibration compensation module 124 decreases the vibration compensation according to the adjusted gyro signal ($S_{gyro}$) data so that the erroneous compensation of the vibration compensation module 124 due to the moving action is avoided advantageously. In other words, the adjusted gyro signal ($S_{gyro}$) data which is inputted to the vibration compensation module 124 allow the vibration compensation module 124 to make no vibration decision and reduce the compensation range. Therefore, the panning effect of the image on the display area due to the activation of the optical image stabilizer (OIS) is solved.

In the vibration compensation module 124, a position sensor 108 senses the position of the optical image stabilizing platform 106 to generate a position signal for compensating the optical image stabilizing platform 106. The summation device 118 is coupled to the second register 116 and the position sensor 108 and computes the compensation difference between the adjusted gyro signal ($S_{gyro}$) data and position signal. The filter 102 is coupled to the summation device 118 and filters the noises of the gyro signal ($S_{gyro}$) data and position signal. The motor driver 122 is coupled to the filter 102 and drives the optical image stabilizing platform 106 based on a driving signal which is generated by the filtered gyro signal data and the position signal.

Figure 2A:
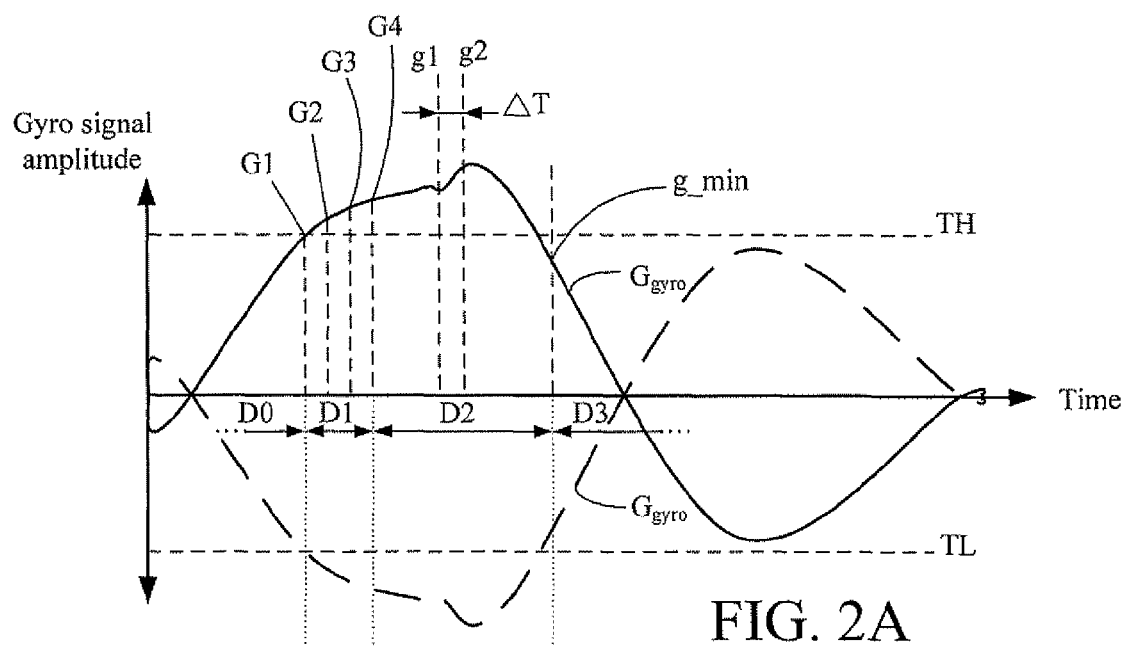
FIG. 2A is a schematic timing waveform view of the gyro signal of the gain-adjusting apparatus according to one embodiment of the present invention.
Figure 2B:
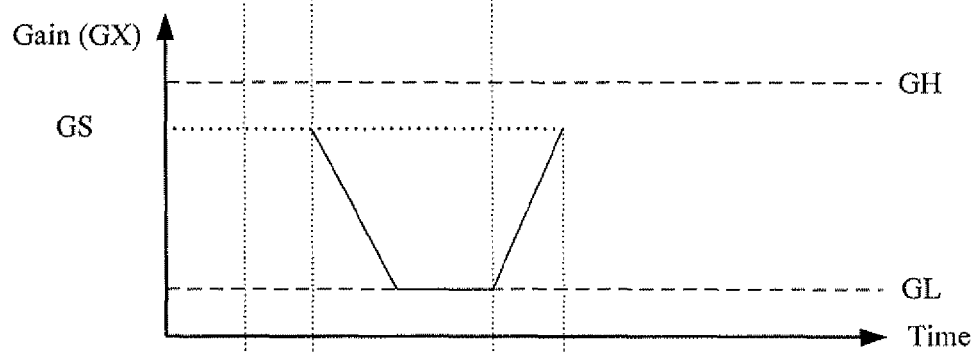
FIG. 2B is a schematic timing waveform view of the gain value of the gain-adjusting apparatus shown in FIG. 2A according to one embodiment of the present invention.
Figure 2C:
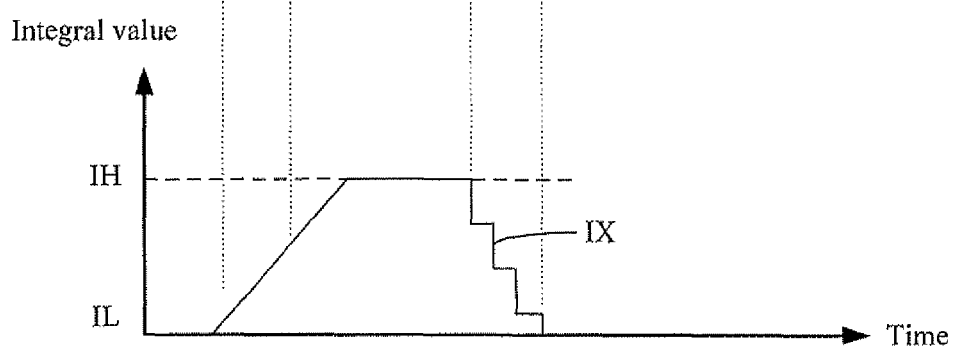
FIG. 2C is a schematic timing waveform view of the integral value of the gain-adjusting apparatus shown in FIG. 2A according to one embodiment of the present invention.

Please refer to FIG. 1 and FIGS. 2A-2C. FIG. 2A is a schematic timing waveform view of the gyro signal of the gain-adjusting apparatus 100 shown in FIG. 1 according to one embodiment of the present invention. The horizontal axis represents time and the vertical axis represents the amplitude of the gyro signal ($S_{gyro}$), such as the angular velocity of gyro in the optical image stabilizer (OIS). FIG. 2B is a schematic timing waveform view of the gain value of the gain-adjusting apparatus shown in FIG. 2A according to one embodiment of the present invention. The horizontal axis represents time and the vertical axis represents the gain value of the gyro signal ($S_{gyro}$). FIG. 2C is a schematic timing waveform view of the integral value of the gain-adjusting apparatus shown in FIG. 2A according to one embodiment of the present invention. The horizontal axis represents time and the vertical axis represents the integral value of the gyro signal ($S_{gyro}$).

As shown in interval D0, when the control unit 114 determines that the gyro signal data is either greater than an upper gyro threshold (TH) or less than a lower gyro threshold (TL), the control unit 114 will start detecting the gyro signal ($S_{gyro}$) data. When the gyro signal data is either smaller than an upper gyro threshold (TH) or greater than a lower gyro threshold (TL), the gain-adjusting apparatus 100 is operated in a vibration mode, and the control unit 114 sets the gain value (GX) in the second register 116 as the predetermined gain value (GS). In one preferred embodiment, during the vibration mode (interval D0) or the detection of the gyro signal ($S_{gyro}$) data (interval D0, the control unit 114 maintains the gain value stored in the second register 116 the same as the predetermined gain value (GS) so that the gyro signal ($S_{gyro}$) data is used to control the vibration compensation module 124 based on the predetermined gain value (GS).

As shown in interval D1, during the detection of the gyro signal ($S_{gyro}$) data, the control unit 114 determines whether a current gyro signal data (G2) is greater than a previous gyro signal data (G1) while the gyro signal ($S_{gyro}$) data is greater than the upper gyro threshold (TH), or whether the current gyro signal (G2) data is less than the previous gyro signal data (G1) while the gyro signal ($S_{gyro}$) data is less than the lower gyro threshold (TL), the gain-adjusting apparatus 100 is operated in a moving action. That is, the mode of the gain-adjusting apparatus 100 is changed from vibration mode to the moving action and the control unit 114 controls the second register 116 to decrease the gain value so that the gain value (GX) is less than the predetermined gain value (GS). In the interval D2, the gain value shown in FIG. 2B is adjusted from the position G4 so that the gain value approaches the predetermined gain value (GS). In one embodiment, the control unit 114 decreases the gain value (GX) in the second register 116 by a step-by-step mode when the gain-adjusting apparatus 100 is operated in the moving action. When the current gyro signal (G2) data is less than the previous gyro signal data (G1), the gain-adjusting apparatus 100 is operated in the vibration mode and the control unit 114 sets the gain value (GX) to be the predetermined gain value (GS).

In one embodiment, the present invention detects the moving action based on the slope change of the gyro signal ($S_{gyro}$) data. For example, the control unit 114 reads the gyro signal ($S_{gyro}$) data, G1, G2, G3, and G4, generated from the analog-digital converter (ADC) (not shown) and computes the difference of the gyro signal ($S_{gyro}$) data including the formula of: $\Delta G1=(G2-G1)$, $©G2(G3-G2)$, $\Delta G3=(G4-G3)$. When $\Delta G2 > \Delta G1$ and $\Delta G3 > \Delta G2$, the gain-adjusting apparatus 100 is operated in moving action. In another case, only the computation of G1 and G2 are used to determine whether the gain-adjusting apparatus 100 is operated in moving action.

When the gain-adjusting apparatus 100 is operated in moving action, the control unit 114 compares the next gyro signal data (g1 or g2) with the upper gyro threshold (TH) or the lower gyro threshold (TL). If the next gyro signal data (g1 or g2 down to g_min) is less than the upper gyro threshold (TH) or greater than the lower gyro threshold (TL), the mode of the gain-adjusting apparatus 100 is changed from the moving action to the vibration mode and the control unit 114 controls the second register 116 to increase the gain value so that the gain value (GX) returns to the predetermined gain value (GS), as shown in interval D3 of FIG. 2B. The next gyro signal data (g1 or g2) is positioned between the upper gyro threshold (TH) and the lower gyro threshold (TL).

If the next gyro signal data (g1 or g2) is greater than the upper gyro threshold (TH) or less than the lower gyro threshold (TL), the gain-adjusting apparatus 100 is still operated in the moving action, as shown in interval D2. The control unit 114 determines whether the gain value (GX) is less than the lower gain threshold (GL). When the gain value (GX) is less than the lower gain threshold (GL), the gain value (GX) is set to be the lower gain threshold (GL). When the gain value (GX) is greater than the lower gain threshold (GL), the control unit 114 continuously decreases the gain value (GX). In one embodiment, during the moving action, the gyro signal data (g1 or g2) is read at an interval ΔT.

As shown in interval D3 of FIG. 2C, when the next gyro signal data (g1 or g2) is less than the upper gyro threshold (TH) or greater than the lower gyro threshold (TL), the control unit 114 decreases the integral value (IX) to the predetermined integral value (IL), e.g. 0 dB or default value. During the moving action, the integral value (IX) is set to be the upper integral threshold (IH). In one embodiment, the integral value (IX) is decreased by step-by-step mode.

Please refer to FIG. 1, FIGS. 2A-2C, 3A-3B, and 4A-4B. FIGS. 3A-3B and 4A-4B are schematic flow charts of controlling method for the gain-adjusting apparatus 100 according to one embodiment of the present invention. The gain-adjusting apparatus 100 includes an integrator 110, a first register 112, a control unit 114 and a second register 116. The controlling method is applicable to the optical image stabilizer (OIS) 102. The gain-adjusting apparatus 100 has a predetermined gain value (GS) between an upper gain threshold (OH) and a lower gain threshold (GL). The controlling method includes the following steps:

In step S300, the integrator 110 receives a gyro signal ($S_{gyro}$) data.

In step S302, the integrator 110 integrates the gyro signal data to generate integral data.

In step S304, the control unit 114 controls the first register 112 to store the gyro signal data and controls the second register 116 to store the gain value (GX).

In steps S306-1 and S306-2, the control unit 114 detects whether the gyro signal data is either greater than an upper gyro threshold (TH) or less than a lower gyro threshold (TL). When the gyro signal data is either greater than an upper gyro threshold (TH) or less than a lower gyro threshold (TL), the control unit 114 starts to detect the gyro signal ($S_{gyro}$) data, as shown in step S306a. When the gyro signal data is either less than an upper gyro threshold (TH) or greater than a lower gyro threshold (TL), the gain-adjusting apparatus 100 is operated in the vibration mode, as shown in step S306b. The control unit 114 sets the gain value (GX) in the second register 116 to be the predetermined gain value (GS). In other words, the gyro signal data is positioned between the upper gyro threshold (TH) and the lower gyro threshold (TL), the control unit 114 sets the gain value in the second register 116 to be the predetermined gain value (GS).

In step S308, the control unit 114 controls the first register 112 to store the predetermined gain value (GS).

Figure 3A:
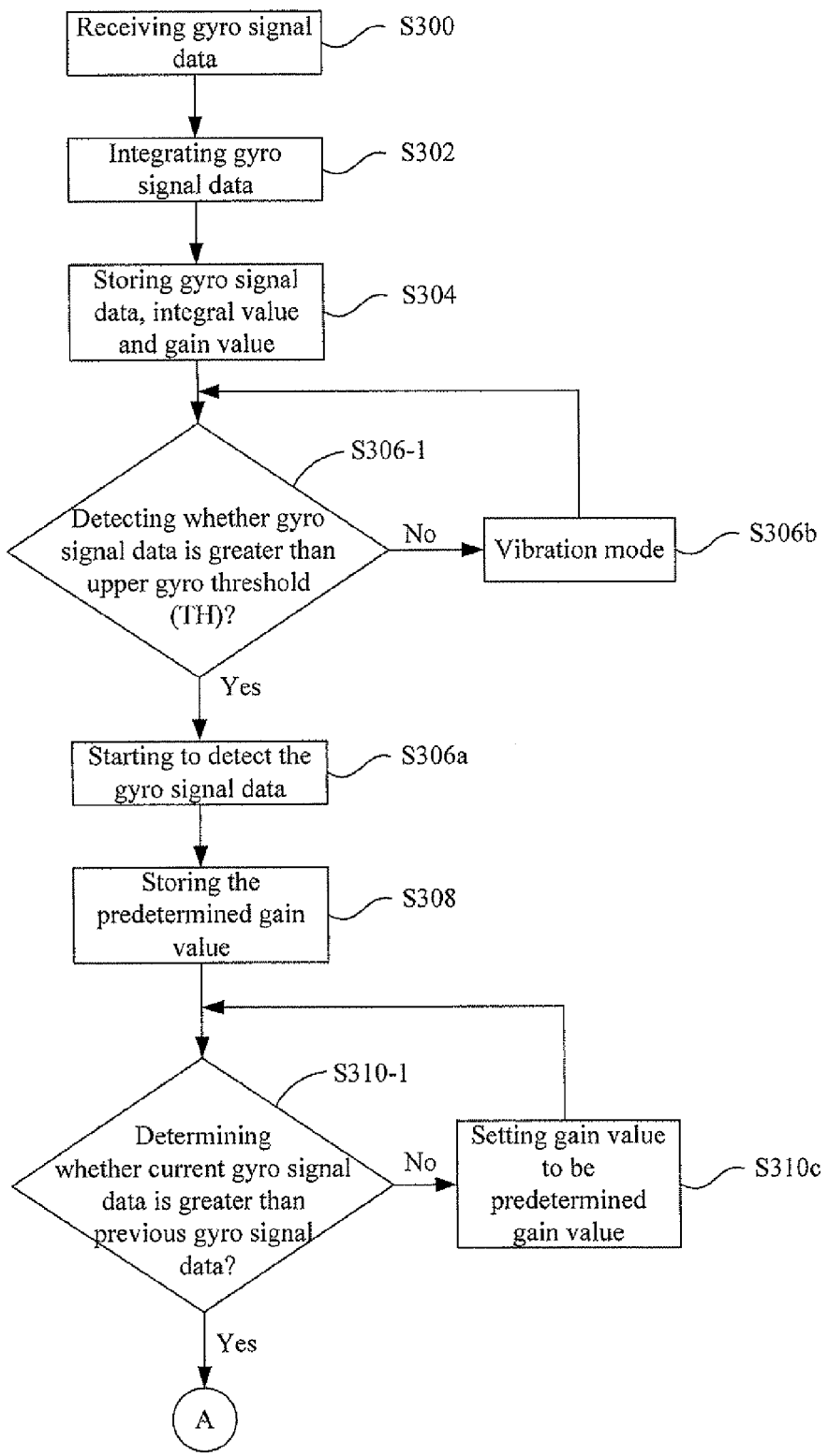
FIGS. 3A-3B and 4A-4B are schematic flow charts of controlling method for the gain-adjusting apparatus according to one embodiment of the present invention.

In step S310-1 of FIG. 3A, during the detection of the gyro signal ($S_{gyro}$) data, the control unit 114 compares the current gyro signal data (G2) with the previous gyro signal data (G1). When the current gyro signal data (G2) is greater than the previous gyro signal data (G1), the gain-adjusting apparatus 100 is operated in the moving action, as shown in step S310a. The control unit 114 decreases the gain value (GX) in the second register 116 such that the gain value (GX) is less than the predetermined gain value (GS), as shown in step S310b. In one embodiment, when the gain-adjusting apparatus 100 is operated in the moving action, the control unit 114 decreases the gain value (GX) by step-by-step mode. When the current gyro signal data (G2) is less than the previous gyro signal data (G1), the gain-adjusting apparatus 100 is operated in the vibration mode and the control unit 114 sets the gain value (GX) to be the predetermined gain value (GS), as shown in step S310c.

Figure 4A:
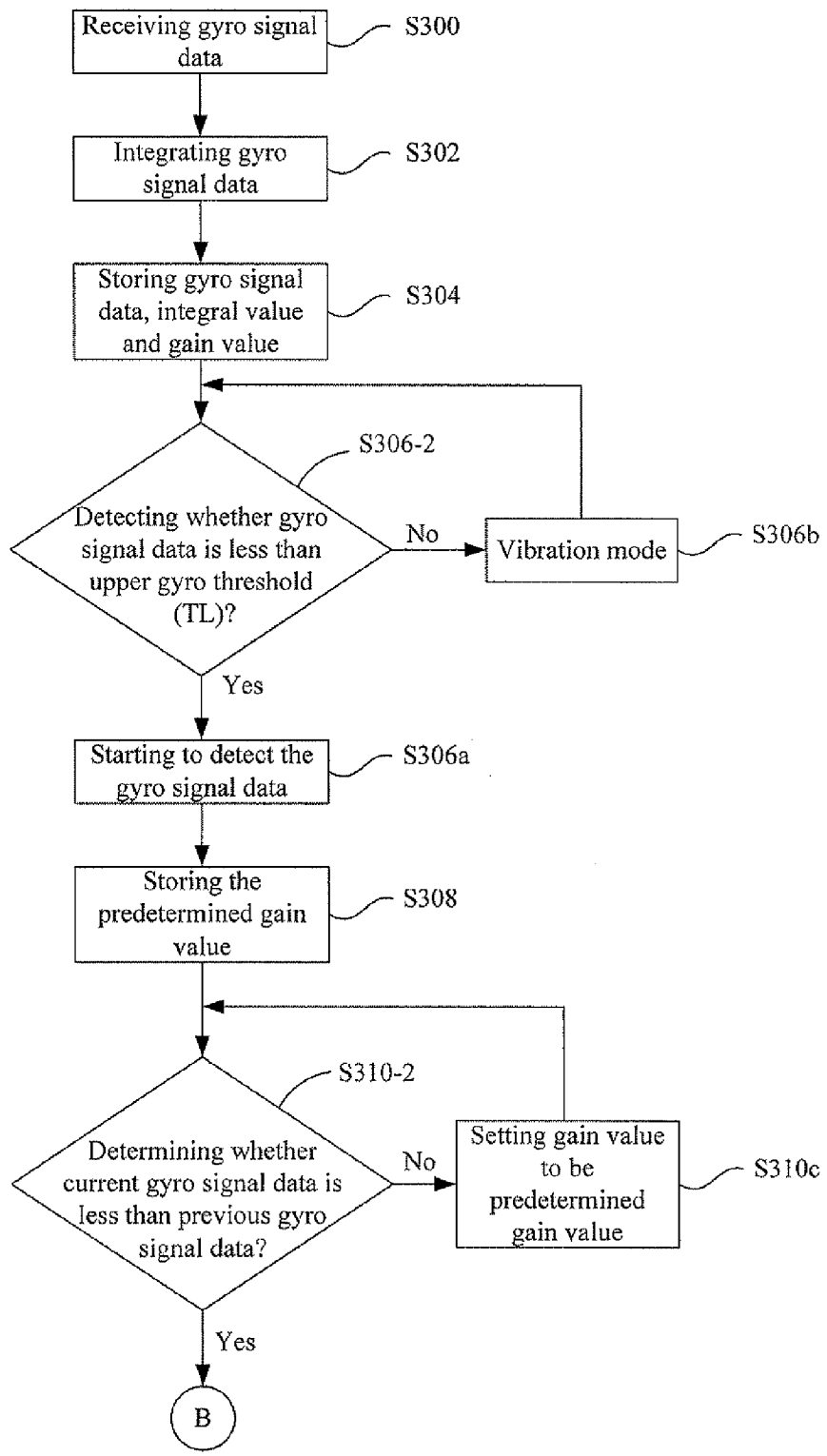

In step S310-2 of FIG. 4A, during the detection of the gyro signal ($S_{gyro}$) data, the control unit 114 compares the current gyro signal data with the previous gyro signal data. When the current gyro signal data is less than the previous gyro signal data, the gain-adjusting apparatus 100 is operated in the moving action, as shown in step S310a. The control unit 114 decreases the gain value (GX) in the second register 116 such that the gain value (GX) is less than the predetermined gain value (GS), as shown in step S310b. In one embodiment, when the gain-adjusting apparatus 100 is operated in the moving action, the control unit 114 decreases the gain value (GX) by step-by-step mode. When the current gyro signal data (G2) is greater than the previous gyro signal data (G1), the gain-adjusting apparatus 100 is operated in the vibration mode and the control unit 114 sets the gain value (GX) to be the predetermined gain value (GS), as shown in step S310c.

Figure 3B:
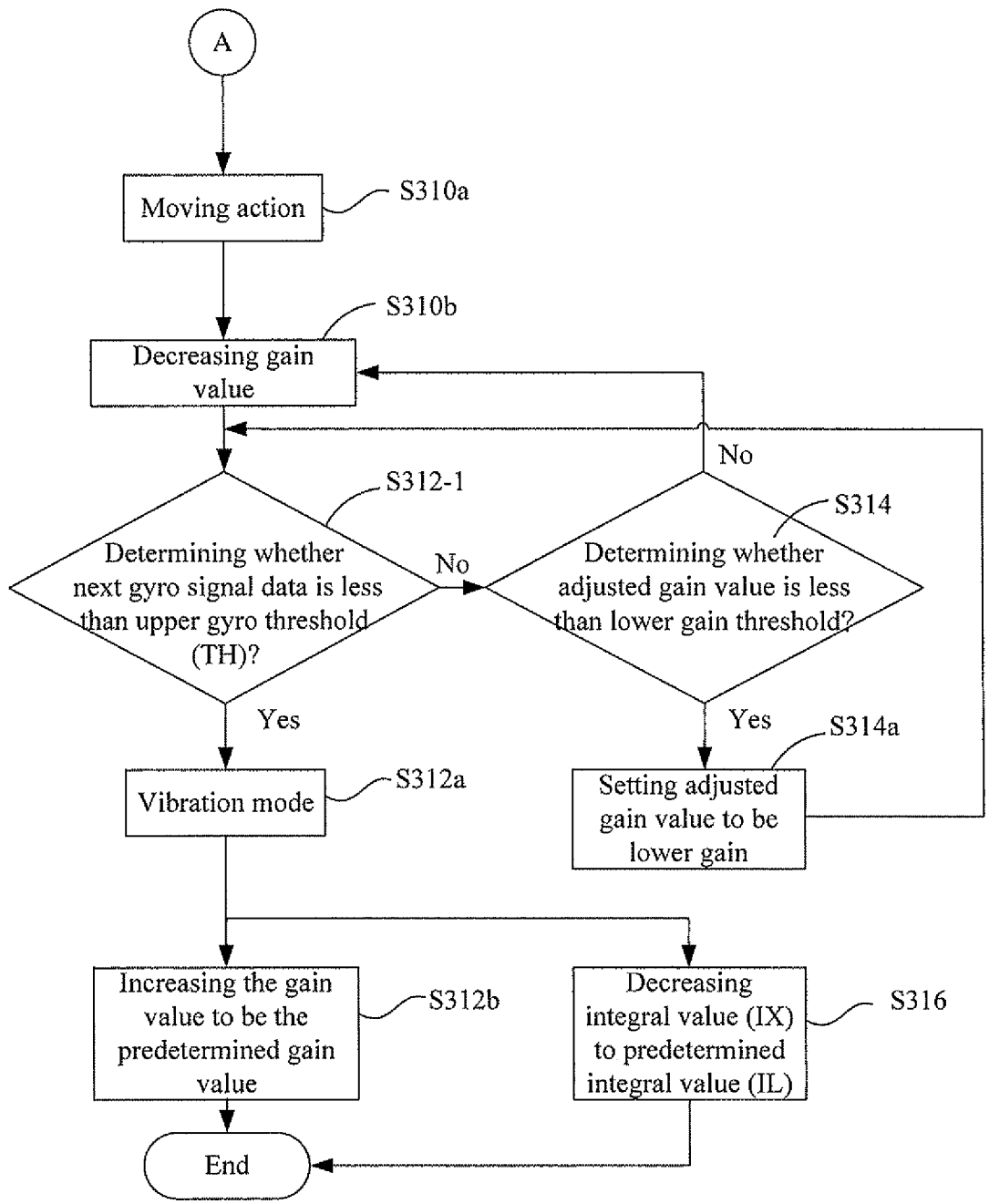

In step S312-1 of FIG. 3B, when the gain-adjusting apparatus 100 is operated in moving action, the control unit 114 compares the next gyro signal data (g1 or g2) with the upper gyro threshold (TH). If the next gyro signal data (g1 or g2) is less than the upper gyro threshold (TH), the mode of the gain-adjusting apparatus 100 is changed from the moving action to the vibration mode and the control unit 114 controls the second register 116 to increase the gain value, as shown in step S312b, so that the gain value (GX) returns to the predetermined gain value (GS). The next gyro signal data (g1 or g2) is positioned between the upper gyro threshold (TH) and the lower gyro threshold (IL).

Figure 4B:
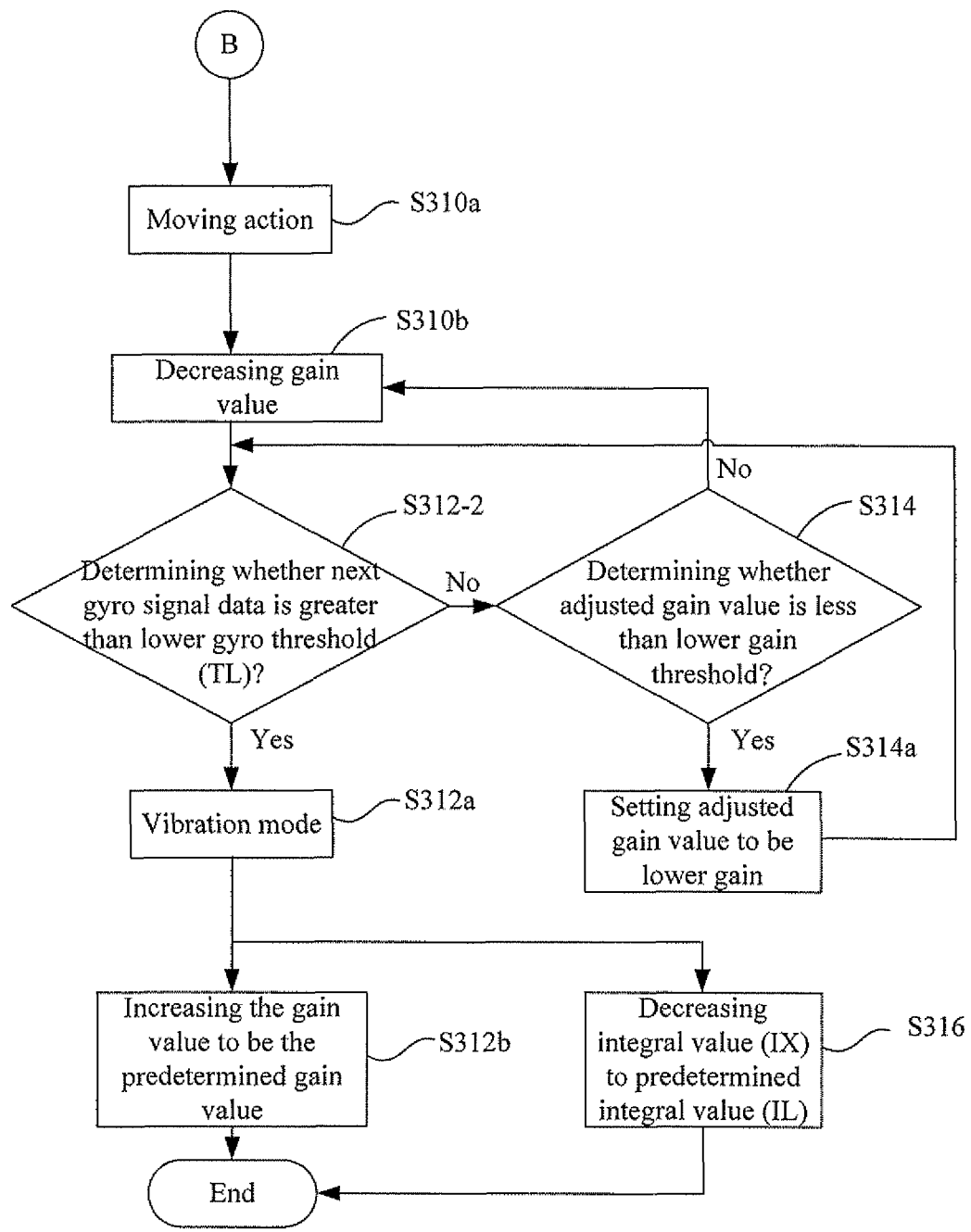

In step S312-2 of FIG. 4B, when the gain-adjusting apparatus 100 is operated in moving action, the control unit 114 compares the next gyro signal data (g1 or g2) with the lower gyro threshold (IL). If the next gyro signal data (g1 or g2) is greater than the lower gyro threshold (TL), the mode of the gain-adjusting apparatus 100 is changed from the moving action to the vibration mode and the control unit 114 controls the second register 116 to increase the gain value, as shown in step S312b, so that the gain value (GX) returns to the predetermined gain value (GS). The next gyro signal data (g1 or g2) is positioned between the upper gyro threshold (TH) and the lower gyro threshold (IL).

While the next gyro signal data (g1 or g2) is greater than the upper gyro threshold (TH) during step S312-1, or the next gyro signal data (g1 or g2) is less than the lower gyro threshold (IL), the gain-adjusting apparatus 100 is still operated in the moving action. Meanwhile, the controlling method further includes step S314. In step S314, the control unit 314 determines whether the adjusted gain value (GX) is less than the lower gain threshold (G1). If the adjusted gain value (GX) is less than the lower gain threshold (GL), the adjusted gain value (GX) is set to be the lower gain threshold (GL), as shown in step 314a. If the adjusted gain value (GX) is greater than the lower gain threshold (GL), returns to step S310b. The control unit 114 continuously decreases the gain value (GX).

In step S316, when the next gyro signal data (g1 or g2) is less than the upper gyro threshold (TH) or greater than the lower gyro threshold (TL), the control unit 114 decreases the integral value (IX) to the predetermined integral value (IL), e.g. 0 dB or default value. During the moving action, the integral value (IX) is set to be the upper integral threshold (IH). In one embodiment, the integral value (IX) is decreased by step-by-step mode.

According to the above-mentioned descriptions, the gain-adjusting apparatus 100 in the present invention determines whether the image processing system is operated in the moving action based on the adjustment of the gyro signal ($S_{gyro}$) data. When the image processing system is operated in the moving action, the gain-adjusting apparatus 100 enters moving action mode. Meanwhile, the control unit 114 adjusts the gain value in the second register 116 to modify the gyro signal ($S_{gyro}$) data. The vibration compensation module 124 decreases the vibration compensation according to the adjusted gyro signal ($S_{gyro}$) data so that the erroneous compensation of the vibration compensation module 124 due to the moving action is avoided advantageously. Therefore, the panning effect of the image on the display area due to the activation of the optical image stabilizer (OIS) is solved.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A gain-adjusting apparatus for an optical image stabilizer (OIS), the gain-adjusting apparatus comprising:
   an integrator, for receiving a gyro signal data and integrating the gyro signal data to generate an integral data;
   a first register coupled to the integrator, for storing the gyro signal data and the integral data, wherein the first register further stores a predetermined gain value between an upper gain threshold and a lower gain threshold based on the gyro signal data and the integral data;
   a second register coupled to the integrator, for storing a gain value; and
   a control unit coupled to the first register and the second register respectively, for detecting whether the gyro signal data is either greater than an upper gyro threshold or less than a lower gyro threshold and decreasing the gain value between the upper gain threshold and the lower gain threshold when the gyro signal data is either greater than an upper gyro threshold or less than a lower gyro threshold.

2. The gain-adjusting apparatus of claim 1, wherein when the gyro signal data is between the upper gyro threshold and the lower gyro threshold, the control unit sets the gain value in the second register as the predetermined gain value.

3. The gain-adjusting apparatus of claim 1, wherein when the gyro signal data is greater than the upper gyro threshold and a current gyro signal data is greater than a previous gyro signal data, the control unit increases the gain value while a next gyro signal data is less than the upper gyro threshold.

4. The gain-adjusting apparatus of claim 3, wherein when the current gyro signal data is less than the previous gyro signal data, the control unit sets the gain value in the second register as the predetermined gain value.

5. The gain-adjusting apparatus of claim 3, wherein when the control unit determines that the next gyro signal data is either greater than the upper gyro threshold or less than the lower gyro threshold, the control unit further determines whether the decreased gain value is less than the lower gain threshold, and the control unit sets the gain value in the second register as the lower gain threshold when the decreased gain value is less than the lower gain threshold.

6. The gain-adjusting apparatus of claim 1, wherein when the gyro signal data is less than the lower gyro threshold and a current gyro signal data is less than a previous gyro signal data, the control unit increases the gain value while a next gyro signal data is greater than the lower gyro threshold.

7. The gain-adjusting apparatus of claim 6, wherein when the current gyro signal data is greater than the previous gyro signal data, the control unit sets the gain value in the second register as the predetermined gain value.

8. The gain-adjusting apparatus of claim 1, wherein when the control unit determines that a next gyro signal data is either less than the upper gyro threshold or greater than the lower gyro threshold, the control unit decreases the integral data to a predetermined integral threshold.

9. A method of adjusting gain value for an optical image stabilizer (OIS), the method comprising the steps of:
   (a) receiving gyro signal data;
   (b) integrating, using an integrator, the gyro signal data to generate integral data;
   (c) storing the gyro signal data, the integral data and a gain value and further storing a predetermined gain value between an upper gain threshold and a lower gain threshold based on the gyro signal data and the integral data; and
   (d) detecting whether the gyro signal data is either greater than an upper gyro threshold or less than a lower gyro threshold and decreasing the gain value between the upper gain threshold and the lower gain threshold when the gyro signal data is either greater than an upper gyro threshold or less than a lower gyro threshold.

10. The method of claim 9, wherein when the gyro signal data is between the upper gyro threshold and the lower gyro threshold during the step (d), the control unit sets the gain value in the second register as the predetermined gain value.

11. The method of claim 9, during the step (d), further comprising the step (e): when the gyro signal data is greater than the upper gyro threshold and a current gyro signal data is greater than a previous gyro signal data, the control unit increases the gain value while a next gyro signal data is less than the upper gyro threshold.

12. The method of claim 11, wherein when the current gyro signal data is less than the previous gyro signal data during the step (e), the control unit sets the gain value in the second register as the predetermined gain value.

13. The method of claim 11, during the step (e), further comprising the step (e1): when the control unit determines that the next gyro signal data is either greater than the upper gyro threshold or less than the lower gain threshold, the control unit further determines whether the decreased gain value is less than the lower gain threshold, and the control unit sets the gain value in the second register as the lower gyro threshold when the decreased gain value is less than the lower gain threshold.

14. The method of claim 9, during the step (d), further comprising the step (f): when the gyro signal data is less than the lower gyro threshold and a current gyro signal data is less than a previous gyro signal data, the control unit increases the gain value while a next gyro signal data is greater than the lower gyro threshold.

15. The method of claim 14, wherein when the current gyro signal data is greater than the previous gyro signal data, the control unit sets the gain value in the second register as the predetermined gain value.

16. The method of claim 9, during the step (f), further comprising the step (g): when the control unit determines that a next gyro signal data is either less than the upper gyro threshold or greater than the lower gyro threshold, the control unit decreases the integral data to a predetermined integral threshold.

* * * * *